No. 730,577. PATENTED JUNE 9, 1903.
L. SIEVERT.
HANDLE FOR UMBRELLAS.
APPLICATION FILED NOV. 3, 1902.
NO MODEL.
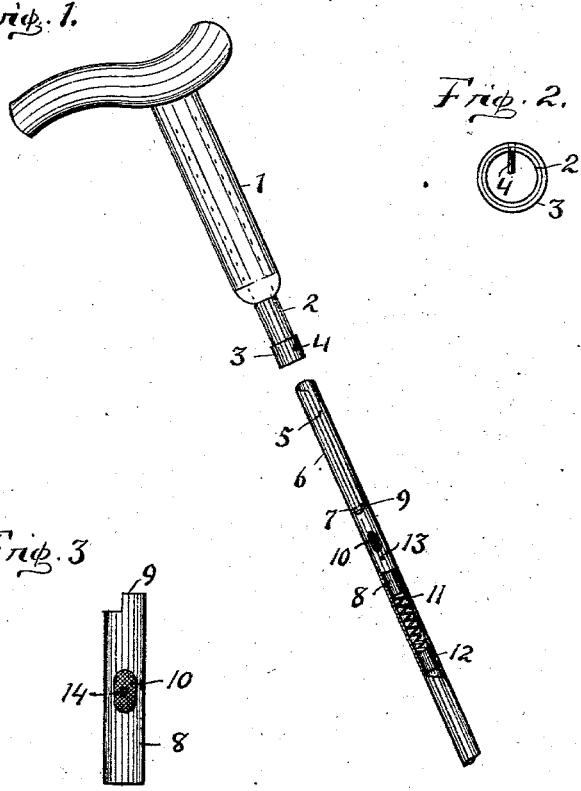
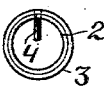
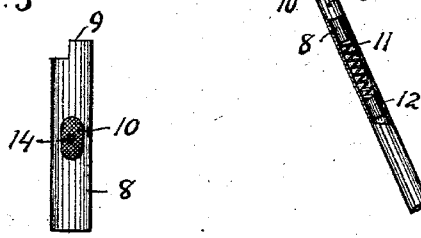
WITNESSES:
INVENTOR
Louis Sievert
BY
ATTORNEY No. 730,577.

Patented June 9, 1903.

UNITED STATES PATENT OFFICE.

LOUIS SIEVERT, OF FORT WAYNE, INDIANA.

HANDLE FOR UMBRELLAS.

SPECIFICATION forming part of Letters Patent No. 730,577, dated June 9, 1903.

Application filed November 3, 1902. Serial No. 129,997. (No model.)

*To all whom it may concern:*

Be it known that I, LOUIS SIEVERT, a citizen of the United States, residing at Fort Wayne, in the county of Allen and State of Indiana, have invented certain new and useful Improvements in Handles for Umbrellas; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in handles for umbrellas; and the object thereof is to provide a detachable handle for umbrellas.

I accomplish my object by the construction illustrated in the accompanying drawings, in which—

Figure 1 is a perspective view showing my handle and staff detached. Fig. 2 is an end view of the handle-shank, and Fig. 3 is an end elevation showing the lock-bolt on an enlarged scale.

Similar numerals of reference indicate corresponding parts throughout the several views, and referring now to the same, 1 is a handle, and 2 is a hollow tubular shank secured in the handle. A ferrule 3 is fixed upon the end of the shank 2 to reinforce the same and to afford support for the pin 4, which is fixed in said ferrule and shank and which extends radially in said shank.

The tubular staff 6 has an open slit 5 ranging from the end thereof and terminating with an offset 7 at its inner end. A lock-bolt 8 is loosely arranged in the staff 6 and is longitudinally movable therein. A thumb-plate 10 is connected with the lock-bolt by means of a pin 14, which passes from the thumb-plate through an elongated slot 13 and is fixed to the lock-bolt. At the upper end of the lock-bolt is a shoulder 9, which ranges beyond the offset 7 when the lock-bolt is in its upper plane of movement. A spring 11 is interposed within the staff between the lower end of the lock-bolt 8 and an anchor-plug 12, which is rigidly fixed in said staff. The said spring tends to hold the lock-bolt in its upper plane of movement.

In the operation of my invention the shank 2 is slid over the staff 6 with the pin 4 in the slit 5, which pin presses the lock-bolt downward, and the handle is turned so as to carry the pin 4 into the offset 7, and the shoulder 9 then retains the pin 4 therein, thus holding the handle in connection with the staff. In removing the handle the thumb-plate is moved downward, thus moving the lock-bolt accordingly and disengaging the shoulder 9 from the pin 4, and by turning the handle the pin is moved out of the offset 7, and the handle may then be withdrawn from the staff.

Having described my invention, what I claim as new, and desire to secure by Letters Patent, is—

A detachable handle for umbrellas, comprising the shank; the radial pin therein; the staff having the open slit therein; the offset at the end of the slit suited to receive the pin; and a lock-bolt ranging in said staff and having a shoulder suited to engage said pin when in said offset and thereby hold the handle upon said staff.

In testimony whereof I affix my signature in presence of two witnesses.

LOUIS SIEVERT.

Witnesses:
 JESSE H. YOUNG,
 LOUISE POHLMEYER.